United States Patent
Baba et al.

(10) Patent No.: US 9,145,924 B2
(45) Date of Patent: Sep. 29, 2015

(54) ROTATION RESTRICTING DEVICE FOR ROTATION MACHINE

(71) Applicant: IHI Corporation, Tokyo (JP)

(72) Inventors: Michiko Baba, Tokyo (JP); Yuuichi Miura, Tokyo (JP); Kouzou Hasegawa, Tokyo (JP); Norimasa Taga, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 14/377,225

(22) PCT Filed: Feb. 7, 2013

(86) PCT No.: PCT/JP2013/053603
§ 371 (c)(1),
(2) Date: Aug. 7, 2014

(87) PCT Pub. No.: WO2013/118920
PCT Pub. Date: Aug. 15, 2013

(65) Prior Publication Data
US 2015/0000465 A1    Jan. 1, 2015

(30) Foreign Application Priority Data
Feb. 9, 2012    (JP) ................................. 2012-026048

(51) Int. Cl.
*B23Q 16/06*    (2006.01)
*F16D 3/04*    (2006.01)
(Continued)

(52) U.S. Cl.
CPC .................. *F16D 3/04* (2013.01); *F16M 11/06* (2013.01); *F16M 11/2007* (2013.01);
(Continued)

(58) Field of Classification Search
CPC .... B23Q 16/001; B23Q 16/06; B23Q 16/043; B25B 13/463; F16D 41/16
See application file for complete search history.

(56) References Cited

U.S. PATENT DOCUMENTS 1,664,851 A * 4/1928 Class ............................. 74/824
1,721,524 A * 7/1929 Moore ........................... 82/137
(Continued)

FOREIGN PATENT DOCUMENTS

EP    0076144 A2    4/1983
EP    0373514 A1    6/1990
(Continued)

OTHER PUBLICATIONS

International Search Report and Written Opinion mailed Apr. 23, 2013 in co-pending PCT application No. PCT/JP2013/053589.
(Continued)

*Primary Examiner* — Vicky Johnson
(74) *Attorney, Agent, or Firm* — Nields, Lemack & Frame, LLC

(57) ABSTRACT

A rotation restricting device for rotation machine comprises a rotation shaft supporting body (2), a rotation shaft (3) rotatably provided on the rotation shaft supporting body, a fixing rind (5) fixed on an end portion of the rotation shaft, a position finding dog (6) provided on the fixing ring, a rotary cam (7) rotatably provided on the rotation shaft and disposed as relatively rotatable with respect to the fixing ring, a cutaway portion (8) formed on the rotary cam, a rotary dog (9) disposed on the rotary cam, and a stopper (13) provided on the rotation shaft supporting body, wherein the position finding dog is accommodated in the cutaway portion and can be rotated within a range in space as formed by the cutaway portion, the stopper is positioned on a locus of rotation of the rotary dog, and the rotation of the rotary cam is restricted when the rotary dog comes in contact with the stopper.

5 Claims, 4 Drawing Sheets

(51) Int. Cl.

| | | |
|---|---|---|
| *F16M 11/06* | (2006.01) | |
| *F16M 11/20* | (2006.01) | |
| *B23Q 16/04* | (2006.01) | |
| *B23Q 16/00* | (2006.01) | |
| *B25B 13/46* | (2006.01) | |
| *F16D 41/16* | (2006.01) | |

(52) U.S. Cl.
CPC ............ *B23Q 16/001* (2013.01); *B23Q 16/043* (2013.01); *B23Q 16/06* (2013.01); *B25B 13/463* (2013.01); *F16D 41/16* (2013.01); *F16M 2200/021* (2013.01); *Y10T 74/14* (2015.01)

(56) References Cited

U.S. PATENT DOCUMENTS

| | | | |
|---|---|---|---|
| 4,382,338 | A | 5/1983 | Possati et al. |
| 5,095,634 | A | 3/1992 | Overlach et al. |
| 5,808,250 | A * | 9/1998 | Torii et al. .................. 200/19.01 |
| 6,931,149 | B2 | 8/2005 | Hagene et al. |
| 2015/0002836 | A1 | 1/2015 | Baba et al. |
| 2015/0007440 | A1 | 1/2015 | Baba et al. |
| 2015/0009322 | A1 | 1/2015 | Baba et al. |
| 2015/0015695 | A1 | 1/2015 | Baba et al. |
| 2015/0015873 | A1 | 1/2015 | Baba et al. |
| 2015/0020395 | A1 | 1/2015 | Baba et al. |
| 2015/0131109 | A1 | 5/2015 | Baba et al. |

FOREIGN PATENT DOCUMENTS

| | | | |
|---|---|---|---|
| EP | 2818825 | A1 | 12/2014 |
| JP | 50-159355 | A | 12/1975 |
| JP | 57-22501 | A | 2/1982 |
| JP | 58-66809 | A | 4/1983 |
| JP | 59-187155 | A | 10/1984 |
| JP | 61-144551 | A | 7/1986 |
| JP | 61-282659 | A | 12/1986 |
| JP | 63-55441 | A | 3/1988 |
| JP | 63-159708 | A | 7/1988 |
| JP | 1-195309 | A | 8/1989 |
| JP | 3-502491 | A | 6/1991 |
| JP | 7-55426 | A | 3/1995 |
| JP | 7-29405 | U | 6/1995 |
| JP | 7-191269 | A | 7/1995 |
| JP | 8-14874 | A | 1/1996 |
| JP | 8-93876 | A | 4/1996 |
| JP | 9-311034 | A | 12/1997 |
| JP | 10-197215 | A | 7/1998 |
| JP | 10-213404 | A | 8/1998 |
| JP | 2000-136923 | A | 5/2000 |
| JP | 2000-146564 | A | 5/2000 |
| JP | 2002-22671 | A | 1/2002 |
| JP | 2002-148036 | A | 5/2002 |
| JP | 2003-139525 | A | 5/2003 |
| JP | 2003-329606 | A | 11/2003 |
| JP | 2004-176852 | A | 6/2004 |
| JP | 3105724 | U | 11/2004 |
| JP | 2005-315814 | A | 11/2005 |
| JP | 2005-331333 | A | 12/2005 |
| JP | 2006-153546 | A | 6/2006 |
| JP | 2006-229551 | A | 8/2006 |
| JP | 2006-234525 | A | 9/2006 |
| JP | 2007-57305 | A | 3/2007 |
| JP | 2007-71852 | A | 3/2007 |
| JP | 2007-248465 | A | 9/2007 |
| JP | 2007-292699 | A | 11/2007 |
| JP | 4230408 | B2 | 2/2009 |
| JP | 2010-164334 | A | 7/2010 |
| JP | 2011-2439 | A | 1/2011 |
| JP | 2011-13060 | A | 1/2011 |
| WO | 2013/118918 | A1 | 8/2013 |

OTHER PUBLICATIONS

International Preliminary Report on Patentability mailed Aug. 21, 2014 in co-pending PCT application No. PCT/JP2013/053589.
International Search Report and Written Opinion mailed Apr. 2, 2013 in co-pending PCT application No. PCT/JP2013/053590.
International Preliminary Report on Patentability mailed Aug. 21, 2014 in co-pending PCT application No. PCT/JP2013/053590.
International Search Report and Written Opinion mailed Apr. 23, 2013 in co-pending PCT application No. PCT/JP2013/053591.
International Preliminary Report on Patentability mailed Aug. 21, 2014 in co-pending PCT application No. PCT/JP2013/053591.
International Search Report and Written Opinion mailed May 7, 2013 in co-pending PCT application No. PCT/JP2013/053592.
International Preliminary Report on Patentability mailed Aug. 21, 2014 in co-pending PCT application No. PCT/JP2013/053592.
International Search Report and Written Opinion mailed Mar. 12, 2013 in co-pending PCT application No. PCT/JP2013/053599.
International Preliminary Report on Patentability mailed Aug. 21, 2014 in co-pending PCT application No. PCT/JP2013/053599.
International Search Report and Written Opinion mailed May 7, 2013 in co-pending PCT application No. PCT/JP2013/053597.
International Preliminary Report on Patentability mailed Aug. 21, 2014 in co-pending PCT application No. PCT/JP2013/053597.
International Search Report and Written Opinion mailed Apr. 16, 2013 in co-pending PCT application No. PCT/JP2013/053598.
International Preliminary Report on Patentability mailed Aug. 21, 2014 in co-pending PCT application No. PCT/JP2013/053598.
International Search Report and Written Opinion mailed Apr. 2, 2013 in corresponding PCT application No. PCT/JP2013/053603.
International Preliminary Report on Patentability mailed Aug. 21, 2014 in corresponding PCT application No. PCT/JP2013/053603.

* cited by examiner

ROTATION RESTRICTING DEVICE FOR ROTATION MACHINE

TECHNICAL FIELD

The present invention relates to a rotation restricting device for rotation machine, which allows a rotating body to rotate at 360° or more and can detect an origin point.

BACKGROUND ART

In a rotation machine, wherein a rotation angle of its rotating body is detected and rotating position of the rotating body is controlled, for instance, in an inner diameter measuring device for measuring an inner diameter by rotating a probe, it is necessary to detect a rotation angle to specify measuring position of the probe, and also, an origin point for measuring the rotation angle is needed. Further, for the purpose of measuring inner diameter over total circumference, rotation amount of at least 360° is needed. Also, for the purpose of supplying electric power to the probe or of giving and taking the measurement result of the probe (electronic signal), cables or the like are to be connected to the probe. To prevent the cutting-off caused by twisting of cables or the like, it is necessary to restrict the rotation.

For this reason, in a rotation restricting device for the rotation machine, a function to detect the origin point must be provided, and also, a function to allow rotation of 360° or more to the rotating body and to restrict rotation more than an angle as predetermined are needed.

As a stopper for allowing rotation of 360° or more, a stopper disclosed in the Patent Document 1 is known. According to the Patent Document 1, there are provided a first circular plate where grooves are formed and a second circular plate having such projections as to be slidably engaged in the grooves. In the grooves as described above, two circular grooves where the centers deviated from each other are connected. A rotating body stopper is disclosed, by which it is possible to rotate for an angle of 360° or more as the projections are striding over from the first circular groove to the second circular groove.

To solve the problems as described above, it is an object of the present invention to provide a rotation restricting device for rotation machine, by which it is possible to restrict the rotation of a rotating body at a rotation angle exceeding 360°.

CONVENTIONAL ART REFERENCE

Patent Document 1: JP-A-2004-176852

DISCLOSURE OF THE INVENTION

The present invention relates to a rotation restricting device for rotation machine comprising a rotation shaft supporting body, a rotation shaft rotatably provided on the rotation shaft supporting body, a fixing ring fixed on an end portion of the rotation shaft, a position finding dog provided on the fixing ring, a rotary cam rotatably provided on the rotation shaft and disposed as relatively rotatable with respect to the fixing ring, a cutaway portion formed on the rotary cam, a rotary dog disposed on the rotary cam, and a stopper provided on the rotation shaft supporting body, wherein the position finding dog is accommodated in the cutaway portion and can be rotated within a range in space as formed by the cutaway portion, the stopper is positioned on a locus of rotation of the rotary dog, and the rotation of the rotary cam is restricted when the rotary dog comes in contact with the stopper.

Further, the present invention relates to the rotation restricting device for rotation machine, wherein a size of the cutaway portion is set so that a sum of a rotation angle of the Position finding dog with respect to the rotary cam and a rotation angle of the rotary cam exceeds 360°.

Further, the present invention relates to the rotation restricting device for rotation machine, wherein a position finding switch is provided on the rotation shaft supporting body in opposition to the rotary cam, and the position finding switch is configured so as to detect the cutaway portion.

Further, the present invention relates to the rotation restricting device for rotation machine, wherein an origin point dog is provided on the other side of the rotation shaft, and an origin point switch for detecting the origin point dog is provided, on the rotation shaft supporting body.

BEST MODE FOR CARRYING OUT THE INVENTION

Description will be given below on an embodiment of the present invention by referring to the attached drawings.

Figure 1:
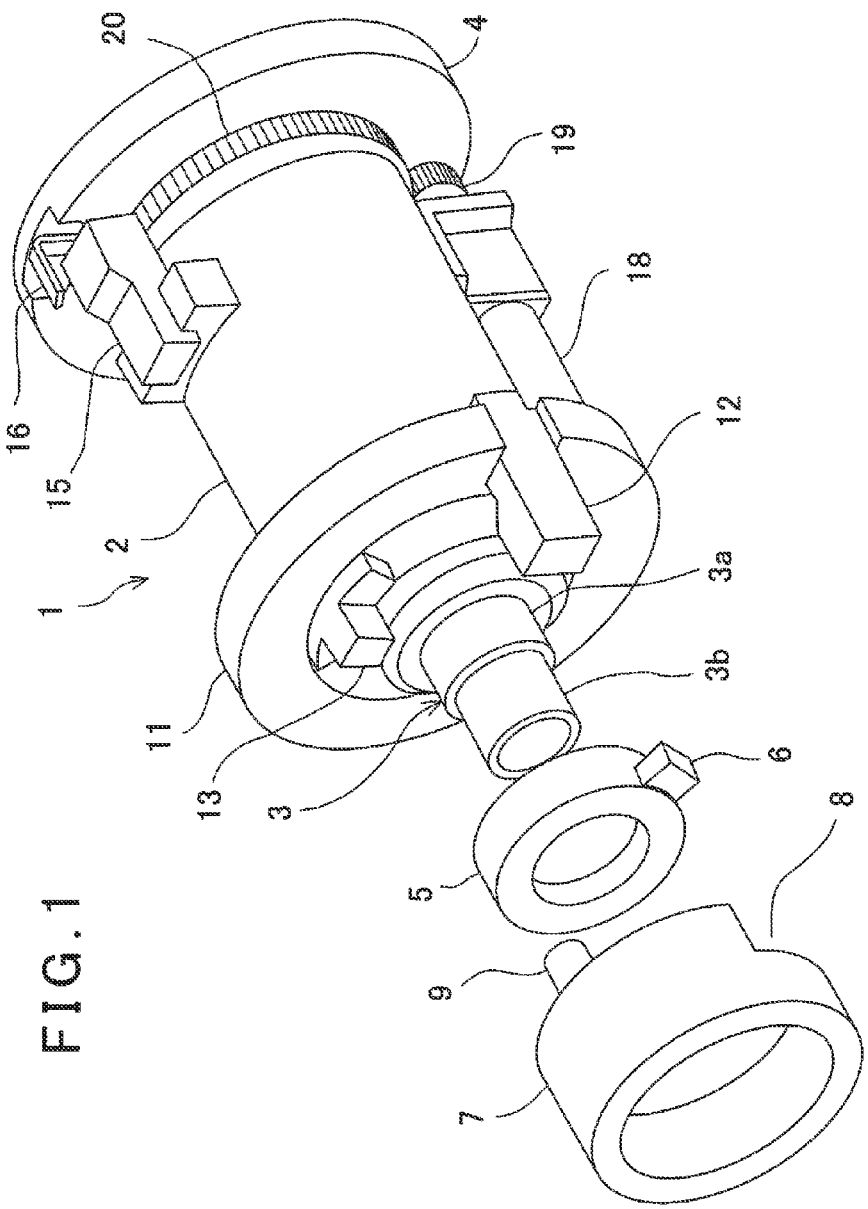
FIG. 1 is a perspective view of an embodiment of the present invention.
Figure 2:
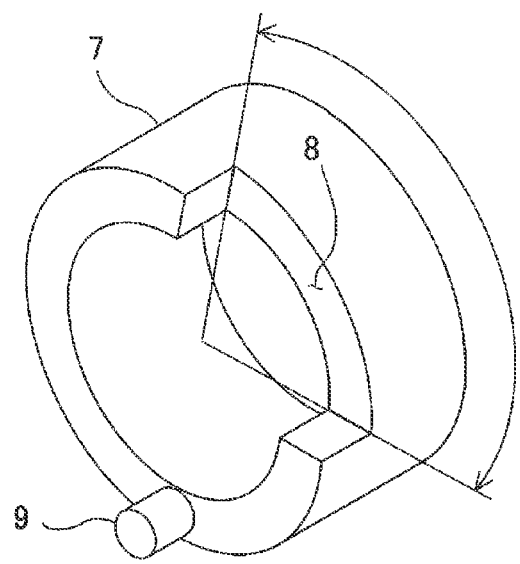
FIG. 2 is a perspective view of a rotary cam in the embodiment.

FIG. 1 and FIG. 2 each denote a rotation unit supporting mechanism 1 which has a rotation restricting device for rotation machine according to the embodiment of the invention. In the figure, reference numeral 2 denotes a bearing housing, which is a rotation shaft supporting body. Inside the bearing housing 2, bearings (not shown) are provided, and a rotation shaft 3 is rotatably supported on the bearing housing 2 via the bearings.

On a base end (at the right end in the figure) of the rotation shaft 3, a rotary flange 4 is formed, and rotation units (not shown) such as measuring units are mounted at the rotary flange 4. A forward end of the rotation shaft 3 is protruded from the bearing housing 2. On the protruded portion of the rotation shaft 3, a large diameter portion 3a and a small diameter portion 3b are formed.

A fixing ring 5 is engaged on the large diameter portion 3a, and a position finding dog 6 protruding in radial direction is provided on outer peripheral surface of the fixing ring 5. On the small diameter portion 3b, a rotary cam 7 is rotatably engaged via a bearing (not shown).

On the rotary cam 7, a cutaway portion 8 is formed within an angular range as required from end surface on a member of short cylindrical shape as shown in FIG. 2. On an end surface where the cutaway portion is formed, a rotary dog 9 is protruded. Under the condition where the rotary cam 7 is incorporated in the small diameter portion 3b, the cutaway portion 8 and the rotary dog 9 stand face to face to a flange 11.

At a forward end of the bearing housing 2, the flange 11 is formed integrally with the bearing housing 2, and a position finding switch 12 is provided on the flange 11. As the position finding switch 12, a limit switch such as proximity switch is used. On the flange 11, a stopper 13 is protruded toward the forward end. The stopper 13 is positioned on a locus of rotation of the rotary dog 9, and it is so arranged that the rotary dog 9 comes in contact with the stopper 13 regardless of whether the rotary cam 7 is rotated in normal or reverse direction.

Under the condition that the fixing ring 5 and the rotary cam 7 are incorporated in the large diameter portion 3a and the small diameter portion 3b respectively, the fixing ring 5 is freely engaged on the rotary cam 7, and further it is so arranged that the position finding dog 6 is accommodated in the cutaway portion 8. The fixing ring 5 is fixed on the large diameter portion 3a, and the rotary cam 7 is rotatably mounted on the small diameter portion 3b. Thus, the fixing ring 5 and the rotary cam 7 are designed as freely rotatable with respect to each other. Moreover, because the position finding dog 6 is accommodated in the cutaway portion 8, the rotary cam 7 can be freely rotatable so far as the position finding dog 6 can move within the cutaway portion 8.

When the rotary dog 9 is rotated, the rotary dog 9 comes in contact with the stopper 13, and the rotation of the rotary cam 7 is so arranged that rotation of the rotary dog 9 is restricted by the stopper 13.

An inner surface (i.e. the surface facing toward the center) of the position finding switch 12 is prepared as a detecting surface, and the detecting surface is arranged so that the detecting surface stands face to face to an outer peripheral surface of the rotary cam 7 with a gap as required between the inner surface and the outer peripheral surface. At a portion of the rotary cam 7 where the position finding switch 12 is positioned face-to-face, a cutaway 8 is formed, and it is so arranged that the position finding switch 12 is to detect the cutaway portion 8, i.e. to detect both ends of the cutaway portion 8.

At a base end of the bearing housing 2, an origin point switch 15 is provided. As the origin point switch 15, a limit switch such as proximity switch is used. An upper surface of the origin point switch 15 is prepared as a detection surface.

On the rotary flange 4, an origin point dog 16 protruding toward the forward end is provided. In a case where the rotary flange 4 is rotated, the origin point dog 16 comes to such a position as to stand face to face to upper surface of the origin point switch 15 at a rotating position as set up. This position is an origin point of the rotation of the rotary flange 4. By detecting the origin point dog 16, the origin point switch 15 detects the origin point of the rotation of the rotary flange 4.

On an outer surface of the bearing housing 2, a rotation motor 18 is provided concentrically with the bearing housing 2, and a driving gear 19 is engaged with an output shaft of the rotation motor 18. On the rotation flange 4, a driven gear 20 is fixed concentrically with the rotation flange 4, and the driven gear 20 is engaged with the driving gear 19. Whereby it is so arranged that the rotary flange 4 and the rotation shaft 3 are rotated by driving the rotation motor 18.

Referring to FIG. 3, description will be given below on operation of the present embodiment.

First, description will be given on the moving of the rotary cam 7 by referring to FIG. 3.

Figure 3A:
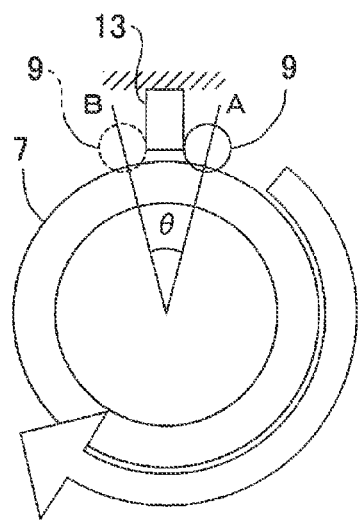
FIG. 3A is a schematical drawing to explain motion of a rotary cam in the embodiment.

The rotation of the rotary cam 7 is restricted by engagement of the rotary dog 9, which is rotated integrally with the rotary cam 7, and the stopper 13, and the rotary dog 9 is rotated from a position A to a position B. Because the rotation is restricted when the rotary dog 9 comes in contact with both sides of the stopper 13, as shown in the figure, maximum rotation angle of the rotary cam 7 will be: 360°−θ, and the rotary cam 7 is not rotated by 360° as a single unit (FIG. 3A).

Now, description will be given on relative rotation of the fixing ring 5 with respect to the rotary cam 7.

Figure 3B:
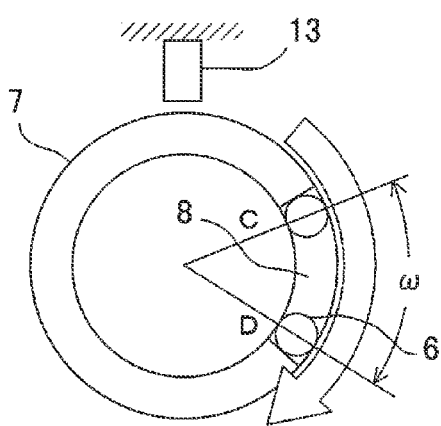
FIG. 3B is a schematical drawing to explain relative rotation of a fixing ring co the rotary cam.

The fixing ring 5 is rotated by relative rotation from a position C to a position C with respect to the rotary cam 7 within a range of rotation of the position finding dog 6 in the cutaway portion 8. Rotation angle of the position finding dog 6 within the cutaway portion 8 is an angle, which is obtained when the angle of the cutaway portion 8 is subtracted by a portion occupied by the position finding dog 6. The angle is shown as ω in the figure. (FIG. 3B)

Therefore, rotation amount of the fixing ring 5 including the rotation amount of the rotary cam 7 will be (360°−θ+ω). If ω is set as θ<ω, the fixing ring 5 can rotate by 360° or more.

Next, description will be given sequentially on the rotation of the rotation shaft 3 by referring to FIG. 4.

Figure 4A:
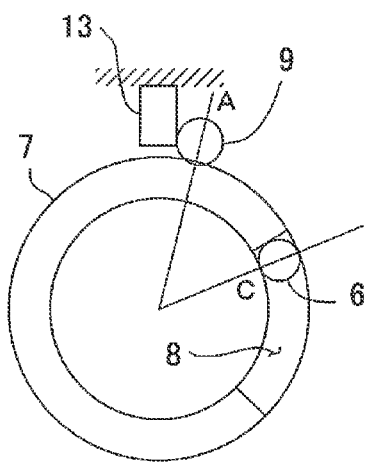
FIG. 4A, FIG. 4B, FIG. 4C and FIG. 4D are schematical drawings to show an operation of the embodiment.
Figure 4B:
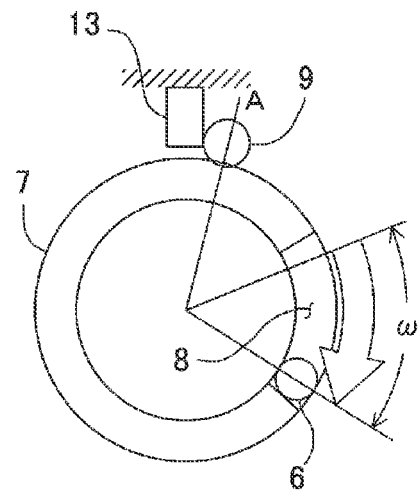

FIG. 4A shows a condition when the rotation angle is 0°. The rotary dog 9 comes in contact with the right side in the figure of the stopper 13, and the position finding dog 6 comes in contact with an end in counterclockwise rotary direction of the cutaway portion 8.

When the rotation shaft 3 is rotated in clockwise direction in FIG. 4, the fixing ring 5 and the position finding dog 6 are integrally rotated at first and are also relatively rotated with respect to the rotary cam 7. Relative rotation is continued until the position tinting dog 6 comes in contact with an end in clockwise rotary direction of the cutaway portion 8. To facilitate the explanation, it is supposed here that the rotary cam 7 is at standstill condition in the relative rotation. Rotation angle at this moment will be ω as described above (FIG. 4B).

Figure 4C:
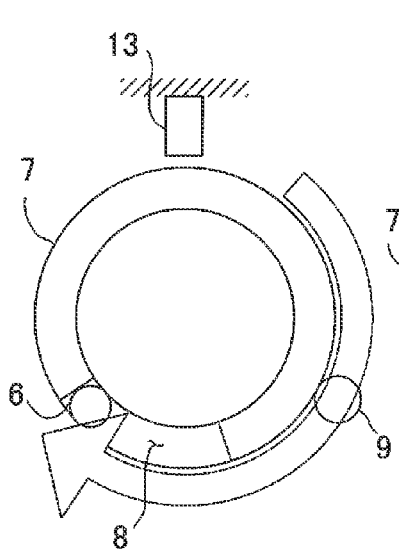

Further, when the rotation shaft 3 is rotated in clockwise direction, the rotary cam 7 is pushed by the position finding dog 6, and the rotary cam 7, the fixing ring 5, and the rotary dog 9 are integrally rotated (FIG. 4C).

When the rotary dog 9 comes in contact with the stopper 13 (on the left side of the stopper 13), further rotation of the rotary cam 7 is constrained. By the constraining of the rotary cam 7, the rotation of the position finding dog 6 is also constrained, and the rotation in clockwise direction of the rotation shaft 3 is constrained via the fixing ring 5. At this moment, the rotary cam 7 is rotated by (360°−θ) (FIG. 4D).

And, the rotation angle of the rotation shaft 3 is set to (360°−θ+ω).

Figure 4D:
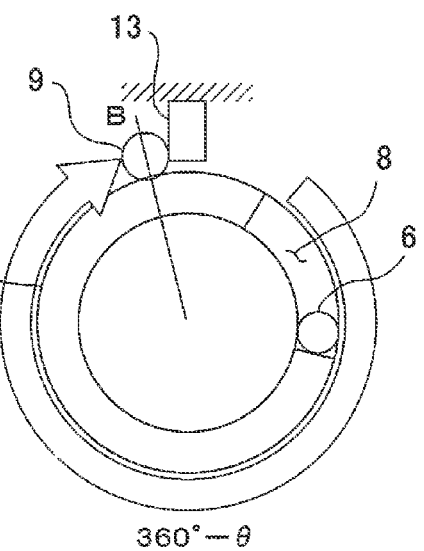

In a case where the rotation shaft 3 is rotated in counterclockwise (direction from the condition shown in FIG. 4D, the rotation shaft 3 is rotated similarly by an angle of (360°−θ+ω) via the processes of FIG. 4D to FIG. 4A.

Before the rotary dog 9 comes in contact with the stopper 13, the position finding switch 12 detects the cutaway portion 8, and based on the detection result of the position finding switch 12, reversal position of the rotation shaft 3 is judged. Therefore, in a case where the stopper 13 is rotated by motor, by controlling the motor based on a detection signal from the Position finding switch 12, reverse control of the motor can be carried out even when the rotary dog 9 is not mechanically brought into contact with the stopper 13.

In a case where rotation angle of the rotation shaft 3 is detected, since the origin point switch 15 detects origin point of the rotation of the rotation shaft 3, and the rotation angle is detected based on a signal from the origin point switch 15.

Figure 5:
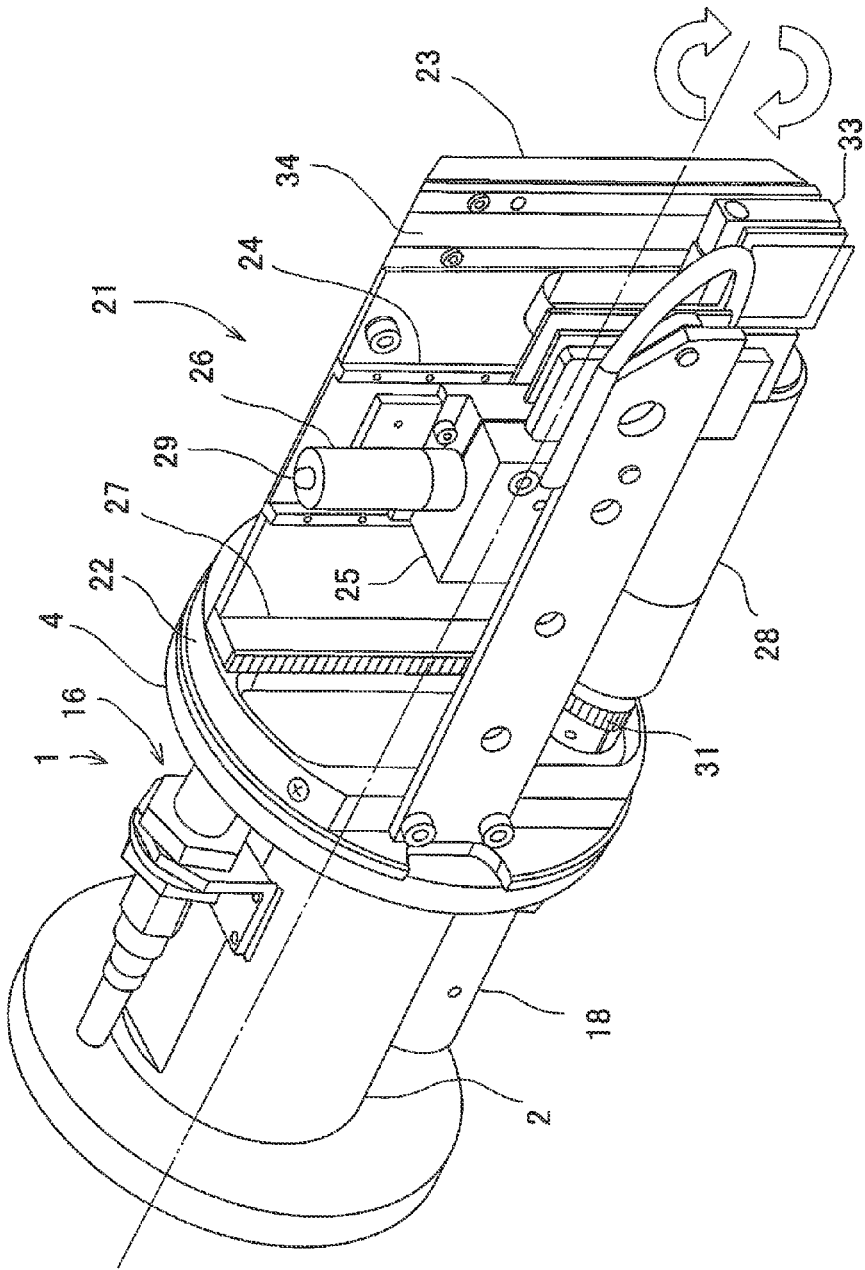
FIG. 5 is a perspective view to show an inner diameter measuring device, which has a rotation restricting device according to the embodiment.

Next, referring to FIG. 5, description will be given on an inner diameter measuring device as an example of a rotation machine where the rotation restricting device according to the present embodiment is applied. In FIG. 5, the same component as shown in FIG. 1 is referred by the same symbol.

An inner diameter measuring head 21 is mounted on the rotary flange 4, and the inner diameter measuring head 21 is rotatably supported on the rotation unit supporting mechanism 1. Description will be given now on the inner diameter measuring head 21.

A circulation base plate 22 is concentrically fixed on the rotary flange 4, and a measuring unit supporting base plate 23 is set in parallel to rotation axis on the circulation base plate 22. A measuring unit holder 25 is installed via a sliding guide 24 on the measuring unit supporting base plate 23 so that the measuring unit holder 25 can move back and forth in diametrical direction. A contact type measuring unit 26 is supported on the measuring unit holder 25.

On the measuring unit supporting base plate 23, a rack 27 is disposed in parallel to the sliding guide 24, and a pinion gear 31 as mounted on output shaft of an advancing/retreating motor 28 is engaged on the rack 27. The advancing/retreating motor 28 is integrated with the measuring unit holder 25, and when the advancing/retreating motor 28 rotates the pinion gear 31, the advancing/retreating motor 28 is advanced or retreated in diametrical direction together with the measuring unit holder 25 and the contact type measuring unit 26. In the figure, reference numeral 29 denotes a contact of the contact type measuring unit 26.

On the measuring unit holder 25, a scale sensor 33 is provided, to move integrally with the measuring unit holder 25. On the measuring unit supporting base plate 23, a linear scale 34 is disposed at a position opposite to the scale sensor 33. When the linear scale 34 is read by the scale sensor 33, position in diametrical direction of the contact type measuring unit 26 can be determined.

The inner diameter measuring head 21 is supported by the rotation unit supporting mechanism 1 so that the inner diameter measuring head 21 can be rotated at an angle of 360° or more, and the inner diameter measuring head 21 can be rotated and driven within the range as restricted by the rotation unit supporting mechanism 1 by means of the rotation motor 18.

In a case where an inner diameter of a pipe is to be measured, the inner diameter measuring head 21 is supported concentrically with the pipe and the inner diameter measuring head 21 is inserted into the pipe, and the contact type measuring unit 26 is moved by the advancing/retreating motor 28 so that the contact 29 is brought into contact with the inner surface of the pipe. Position of the contact type measuring unit 26 is detected by the scale sensor 33. Further, when displacement of the contact. 29 is detected by the contact type measuring unit 26, a position in diametrical direction where the contact 29 is brought into contact is measured. Position in peripheral direction is measured by detecting the rotation angle of the measuring unit supporting base plate 23.

Further, by rotating the inner diameter measuring head 21 by means of the rotation motor 18, measurement can be performed on inner diameter of the pipe over total circumference.

Description has been given on an inner diameter measuring device as an example of rotation machine when the rotation restricting device of the present embodiment is applied, while it is needless to say that this can be applied as a rotation restricting device for a rotation unit such as a robot arm or the like.

INDUSTRIAL APPLICABILITY

According to the present invention, a rotation restricting device for rotation machine comprises a rotation shaft supporting body, a rotation shaft rotatably provided on the rotation shaft supporting body, a fixing ring fixed on an end portion of the rotation shaft, a position finding dog provided on the fixing ring, a rotary cam rotatably provided on the rotation shaft and disposed as relatively rotatable with respect to the fixing ring, a cutaway portion formed on the rotary cam, a rotary dog disposed on the rotary cam, and a stopper provided on the rotation shaft supporting body, wherein the position finding dog is accommodated in the cutaway portion and can be rotated within a range in space as formed by the cutaway portion, the stopper is positioned on a locus of rotation of the rotary dog, and the rotation of the rotary cam is restricted when the rotary dog comes in contact with the stopper. As a result, the rotation angle of the rotation shaft is a sum of the rotation angle of the rotary cam itself and the relative rotation angle between the fixing ring and the rotary cam, and this makes it possible to restrict the rotation at a rotation angle exceeding 360°.

The invention claimed is:

1. A rotation restricting device for rotation machine, comprising a rotation shaft supporting body, a rotation shaft provided so as to be rotatable with respect to said rotation shaft supporting body, a fixing ring fixed on an end portion of said rotation shaft, a position finding dog protruding in a radial direction and provided on said fixing ring, a rotary cam disposed concentrically outside said rotation shaft, a cutaway portion formed on said rotary cam, a rotary dog protruding toward said rotation shaft supporting body and disposed on said rotary cam, and a stopper protruding toward said rotary cam and provided on said rotation shaft supporting body, wherein said position finding dog is accommodated in said cutaway portion and said fixing ring can be relatively rotated within a range in space as formed by said cutaway portion with respect to said rotary cam, said stopper is positioned on a locus of rotation of said rotary dog, and said rotary cam rotates relative to said rotation shaft supporting body until said rotary dog comes in contact with said stopper, wherein a rotation angle of said rotation shaft is a sum of a relative rotation angle of said fixing ring with respect to said rotary cam and a relative rotation angle of said rotary cam with respect to said rotation shaft supporting body.

2. A rotation restricting device for rotation machine according to claim 1, wherein a size of said cutaway portion is set so that a sum of a rotation angle of said position finding dog with respect to said rotary cam and a rotation angle of said rotary cam exceeds 360°.

3. A rotation restricting device for rotation machine according to claim 2, wherein a position finding switch is provided on said rotation shaft supporting body in opposition to said rotary cam, and said position finding switch is configured so as to detect said cutaway portion.

4. A rotation restricting device for rotation machine according to claim 1, wherein a position finding switch is provided on said rotation shaft supporting body in opposition to said rotary cam, and said position finding switch is configured so as to detect said cutaway portion.

5. A rotation restricting device for rotation machine according to claim 1, wherein an origin point dog is provided on the other side of said rotation shaft, and an origin point switch for detecting said origin point dog is provided on said rotation shaft supporting body.

* * * * *